(12) United States Patent
Fink et al.

(10) Patent No.: US 7,406,443 B1
(45) Date of Patent: Jul. 29, 2008

(54) METHOD AND SYSTEM FOR MULTI-DIMENSIONAL TRADING

(75) Inventors: Eugene Fink, Lutz, FL (US); Ganesh Mani, Pittsburgh, PA (US); Dwight E. Dietrich, Bradfordwoods, PA (US); Joshua M. Johnson, Tampa, FL (US); Steven V. Fischetti, Pittsburgh, PA (US); Jamie Carbonell, Pittsburgh, PA (US)

(73) Assignee: Powerloom, Pittsburgh, PA (US)

( * ) Notice: Subject to any disclaimer, the term of this patent is extended or adjusted under 35 U.S.C. 154(b) by 939 days.

(21) Appl. No.: 09/737,595

(22) Filed: Dec. 18, 2000

(51) Int. Cl.
*G06Q 40/00* (2006.01)

(52) U.S. Cl. .............. 705/37; 705/35; 707/2; 707/3; 707/102

(58) Field of Classification Search .......... 705/35–43, 705/39, 26; 707/1–5, 102
See application file for complete search history.

(56) References Cited

U.S. PATENT DOCUMENTS

| | | | |
|---|---|---|---|
| 4,799,156 A | 1/1989 | Shavit et al. ............. 364/401 |
| 5,237,678 A * | 8/1993 | Kuechler et al. ............. 707/5 |
| 5,715,402 A | 2/1998 | Popolo ................. 395/237 |
| 5,717,989 A | 2/1998 | Tozzoli et al. ............. 705/37 |
| 5,732,400 A | 3/1998 | Mandler et al. ............. 705/26 |
| 5,752,243 A * | 5/1998 | Reiter et al. ............. 707/3 |
| 5,781,906 A * | 7/1998 | Aggarwal et al. ........... 707/102 |
| 5,794,207 A | 8/1998 | Walker et al. ............. 705/23 |
| 5,826,240 A | 10/1998 | Brockman et al. ........... 705/11 |
| 5,842,178 A | 11/1998 | Giovannoli ............. 705/26 |
| 5,845,265 A | 12/1998 | Woolston ............. 705/37 |
| 5,873,071 A | 2/1999 | Ferstenberg et al. ........ 705/37 |
| 5,924,082 A | 7/1999 | Silverman et al. ........... 705/37 |
| 5,924,083 A | 7/1999 | Silverman et al. ........... 705/37 |
| 6,012,046 A | 1/2000 | Lupien et al. ............. 705/37 |
| 6,035,288 A | 3/2000 | Solomon ................. 705/37 |
| 6,035,289 A | 3/2000 | Chou et al. .............. 705/37 |
| 6,041,310 A | 3/2000 | Green et al. ............. 705/27 |
| 6,041,311 A | 3/2000 | Chislenko et al. ........... 705/27 |
| 6,047,283 A * | 4/2000 | Braun ................. 707/3 |
| 6,058,417 A | 5/2000 | Hess et al. ............. 709/219 |
| 6,072,481 A | 6/2000 | Matsushita et al. .......... 345/326 |
| 6,085,169 A | 7/2000 | Walker et al. ............. 705/26 |
| 6,085,176 A | 7/2000 | Woolston ............. 705/37 |

(Continued)

FOREIGN PATENT DOCUMENTS

JP 2001160940 A * 6/2001

(Continued)

OTHER PUBLICATIONS

Autotrader.com, "Used cars, Sell your car, Auto Financing & Insurance—Autotradercom homepage", Jul. 20, 2000.

(Continued)

*Primary Examiner*—Narayanswamy Subramanian
(74) *Attorney, Agent, or Firm*—Morgan, Lewis & Bockius LLP

(57) ABSTRACT

A method to trade objects over a network is described. A first order for an object having at least four dimensions associated with the object is received. A memory is searched for a second order with an object having at least four dimensions. The first order is matched with the second order in accordance with the search.

6 Claims, 12 Drawing Sheets

U.S. PATENT DOCUMENTS

| | | | |
|---|---|---|---|
| 6,112,181 A * | 8/2000 | Shear et al. | 705/1 |
| 6,119,101 A * | 9/2000 | Peckover | 705/26 |
| 6,131,087 A | 10/2000 | Luke et al. | 705/26 |
| 6,144,848 A * | 11/2000 | Walsh et al. | 455/419 |
| 6,240,407 B1 * | 5/2001 | Chang et al. | 707/2 |
| 6,338,056 B1 * | 1/2002 | Dessloch et al. | 707/2 |
| 6,493,683 B1 * | 12/2002 | David et al. | 705/37 |
| 6,751,597 B1 * | 6/2004 | Brodsky et al. | 705/37 |
| 6,868,400 B1 * | 3/2005 | Sundaresan et al. | 705/37 |
| 7,308,418 B2 * | 12/2007 | Malek et al. | 705/10 |
| 2001/0039527 A1 * | 11/2001 | Ordish et al. | 705/37 |
| 2002/0016759 A1 * | 2/2002 | Macready et al. | 705/37 |
| 2003/0097325 A1 * | 5/2003 | Friesen et al. | 705/37 |
| 2007/0061335 A1 * | 3/2007 | Ramer et al. | 707/10 |
| 2007/0168335 A1 * | 7/2007 | Moore et al. | 707/3 |
| 2007/0233730 A1 * | 10/2007 | Johnston | 707/104.1 |

FOREIGN PATENT DOCUMENTS

WO     WO 2004/003705 A2 *   1/2004

OTHER PUBLICATIONS

FreeMarkets.com, homepage, Jul. 20, 2000.
Master.com, "Welcome to Master.com", Jul. 20, 2000.
CareerBuilder.com, homepage, Jul. 20, 2000.
CareerMosiac.com "Career Mosiac/Welcome to Jobs Direct Placement" Jul. 20, 2000.
eRealty.com, "eRealty—The Smarter Way to Buy or Sell a Home in Washington, DC Metro Area", Jul. 20, 2000.

\* cited by examiner

Broker's data structures
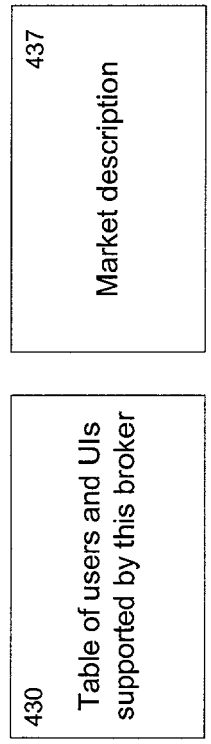
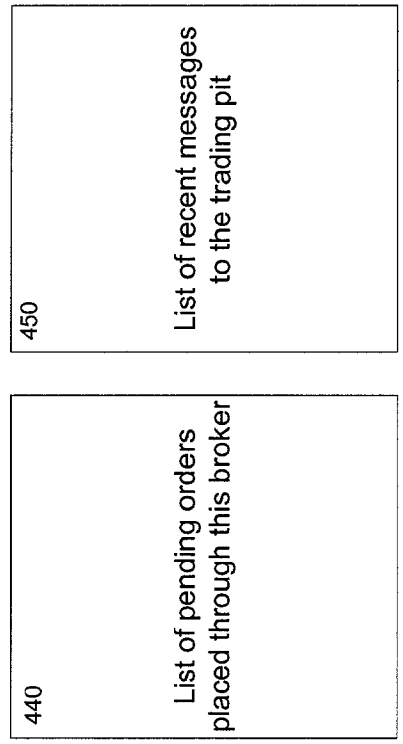
Fig. 4B
Trading Pit's data structures
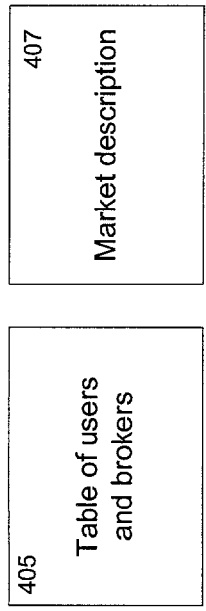
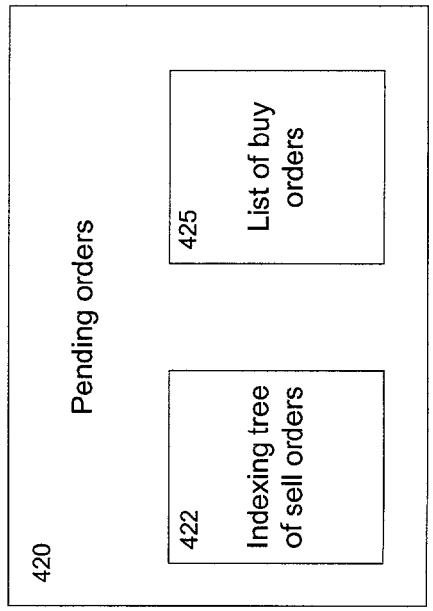
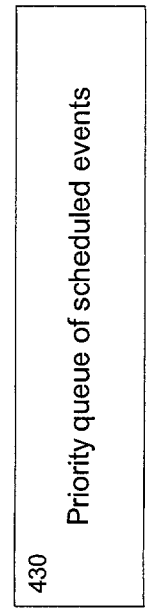
Fig. 4A

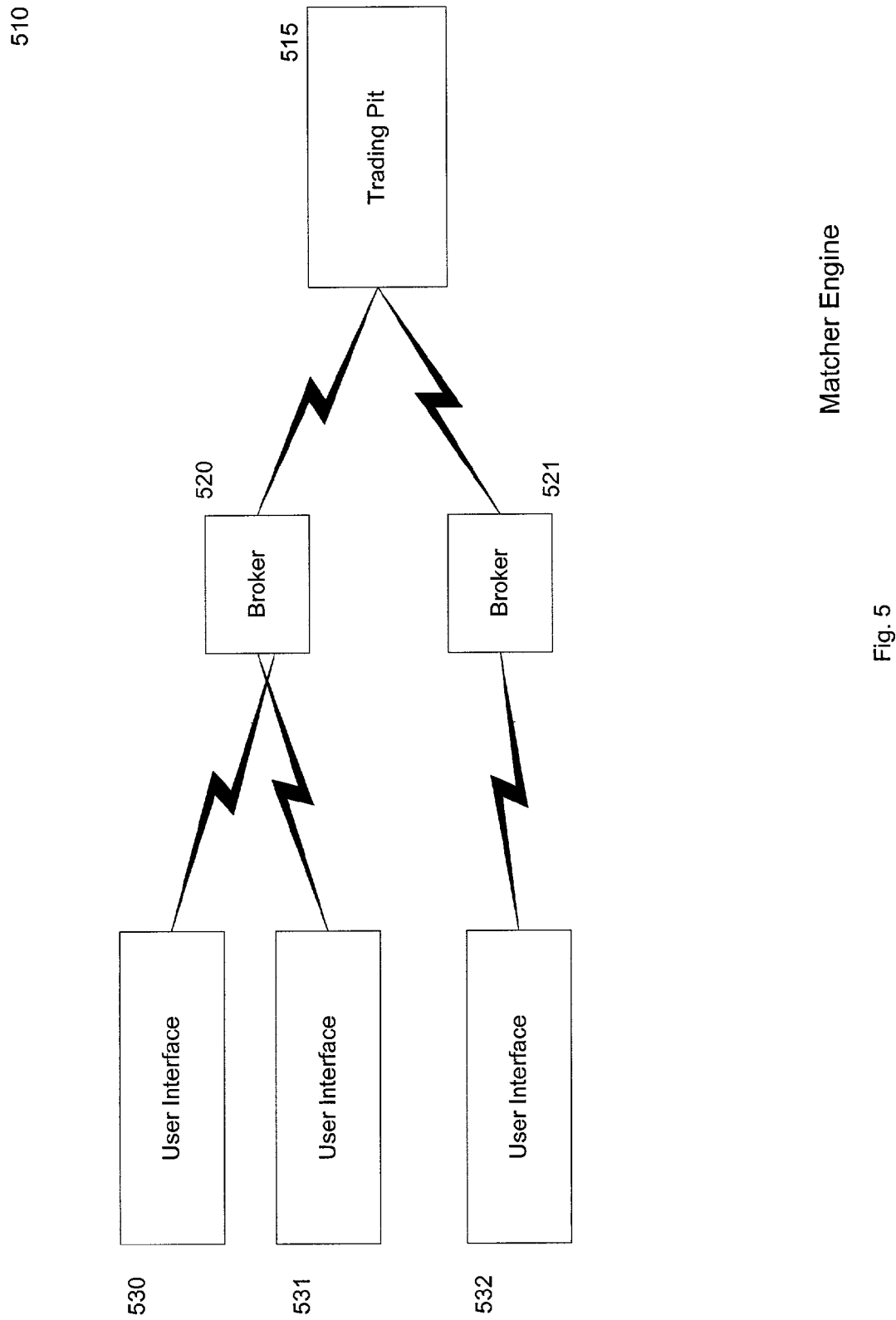
Fig. 5    Matcher Engine

METHOD AND SYSTEM FOR MULTI-DIMENSIONAL TRADING

FIELD OF THE INVENTION

The present invention generally relates to a computer-based method and system for trading goods and services. In particular, the system and method of the present invention provides an electronic platform for multiple buyers and multiple sellers real-time trading of any type.

BACKGROUND OF THE INVENTION

The growing prevalence of the Internet has changed the marketplace for global commerce. Both businesses and consumers are trying to leverage the Internet to help minimize the costs of buying and selling goods and services. Electronic commerce on the Internet is making it possible to connect buyers and sellers of raw materials, supplies, finished products, services—anything that can be bought and sold. New marketplaces are forming daily for the sole purpose of buying and selling goods and services, some of which have never been actively traded before. These electronic marketplaces match buyers and sellers so that transactions can take place electronically.

The Internet is a compelling electronic commerce platform for many reasons. Access to the Internet is ubiquitous. Even the simplest networked computer capable of running a browser provides a real-time window to the entire Internet. The transaction process—deciding what to buy/sell, actually buying or selling, and the trade settlement can be done in a very efficient manner using the Internet. Information on the Internet concerning the buying and selling of goods and services can be updated, and is instantaneously available to all interested parties. Buyers and sellers can share important information about each aspect of the transaction decision. As participation in the electronic markets increases, so too do choices and opportunities to consummate commerce transactions in a manner that more efficiently meets the needs of buyers, sellers, and market makers.

The first online markets have used the "catalog" model, which basically makes hardcopy catalogs available to buyers electronically via the Internet. In the catalog model, the prices of goods and services are fixed by the seller and offered statically to the marketplace. These first electronic catalogs have helped buyers obtain information about available products, and order products online.

Offering products online in this static catalog format has been an easy and comfortable way for early electronic market ("e-market") participants to leverage some of the benefits of Internet commerce. Sellers typically post the price lists, catalogs, and sales brochures already in use. Buyers can peruse information from anywhere and make a purchase at any time.

However, the static prices of catalog markets are a disadvantage. Although a seller can check the marketplace on a periodic basis to ensure that his product's attributes (price, quality, color, tolerances, etc.) are satisfactory for buyers and update accordingly, catalog updates typically occur infrequently.

In addition, most catalog markets are single-source; i.e., they only allow customers to obtain information and products from one seller. Therefore, some electronic catalogs have been updated to include information about competing products. For example, CNET (www.cnet.com) provides information about a variety of hardware sellers and gives a comparative analysis of their prices. With the inclusion of this additional information in the electronic catalog, the information search cost for buyers is therefore reduced even further. By offering competing products, the electronic catalog that offers products from many competitors becomes an "electronic market." Many of these catalog systems, however, are biased towards the seller offering the electronic catalog or market.

The "auction" model of electronic commerce has been developed as a less-biased electronic market promoting competition in order to reduce transaction costs even further. In addition to providing a less-biased market, the auction model facilitates dynamic "price discovery," as opposed to the static catalog prices.

When many buyers compete for the right to buy from one seller, a buyer-bidding auction model is created. A buyer-bidding auction model allows the buyers to set the price at which they are willing to buy. The seller decides whether to accept the set price and execute the transaction. These seller-centric markets allow the price to dynamically increase until the auction closes.

Seller-bidding auctions have also been developed. For example, a reverse-auction model has been developed that creates e-markets by allowing the price to dynamically decrease, until the auction closes. This model is conducive to electronic auctions for various goods or services, such as when a seller may be a potential supplier bidding on a supply contract. These types of reverse auctions are typically between one buyer and many sellers. In this buyer-centric type of auction, the buyer usually defines the desired products or services for the sellers to bid upon. An example of successful seller-bidding auctions are those conducted by FreeMarkets Inc., which has built a reverse auction for large business-to-business transactions.

FIG. 1A illustrates the pricing for a catalog model e-market. As shown, unless the seller updates his published price, the price of a product remains constant over time. FIG. 1B illustrates the pricing for a buyer-bidding auction. As shown, the price of a product increases over time with each bid in the buyer-bidding auction model, as one would expect in a seller-centric model. FIG. 1C illustrates a seller-bidding, or reverse auction e-market. As shown, the price of a product goes down over time, as one would expect in a buyer-centric model.

Auction markets have received an enormous amount of interest and are creating significant economic and commercial advantage for buyers, sellers and market makers. For example, eBay (www.ebay.com) has generated several hundred million transactions.

However, there are certain limitations to auction-style e-markets. Typical auction e-markets constrain the Internet as an efficient e-commerce platform.

One limitation of auction model e-markets is lack of symmetry—many buyer-bidding auctions have one seller, and many reverse auctions have one buyer. Buyer-bidding auctions are designed to benefit the seller by obtaining the highest possible price of a product. Likewise, reverse auctions are buyer-centric, and are designed to benefit the buyer by obtaining the lowest possible price.

Another significant limitation is time. Many auction sessions run for only a few hours, or days at most. These auction models therefore provide only a brief window of time for dynamic price discovery to take place. The lack of symmetry and the limited time period of the auction model markets frequently prevent true dynamic price discovery from occurring.

Another major limitation is a lack of liquidity, as each transaction may take several hours or even several days. For example, if a seller posts an item on eBay, he or she can sell it in three or more days, depending on the specified duration of the auction, but no sooner. Thus, auctions are not appropriate for fast sales or purchases, which are essential in many markets. If a buyer needs a fast transaction, he or she may have to use a traditional catalog system.

An exchange-based marketplace allows many buyers and many sellers to simultaneously conduct trading within a single marketplace. Unlike catalog and auction models, an exchange is a multi-buyer, multi-seller marketplace that is not biased towards any party. Also unlike many catalog and auction models, exchanges are not constrained by closing times, but provide for continuous trading. The dynamic pricing achieved by an electronic exchange is illustrated in FIG. 1D. As shown, the price dynamically changes as the supply price continuously tries to match the demand price, resulting in an efficient marketplace. Another important advantage of exchanges is high liquidity. With high liquidity, a buyer or seller can usually complete a transaction in just a few minutes.

Examples of the exchange concept applied to e-markets include the trading of stocks on the New York Stock Exchange (NYSE) and over-the-counter equity securities on the National Association of Securities Dealers Automated Quotations (NASDAQ) system. The domestic stock market is one of the most mature, efficient markets in the world. These and other emerging electronic equity exchange platforms have demonstrated the efficiencies that can be acquired through the use of an electronic exchange marketplace.

To avoid the limitations of electronic catalogs and auctions and improve performance, what is needed is an exchange-based marketplace for goods and services that enables many buyers and many sellers to conduct ongoing, real-time trading within a single site. However, unlike the securities market wherein the information needed for a trade consists only of the stock identifier, number of shares and price per share, most goods and services require a larger number of parameters to be specified before a trade can take place.

The automatic matching of a buyer's "bid" and a seller's "ask" in the equities market is conceptually simple. By searching through all the orders for a particular stock, it is a matter of finding a bid price that matches an ask price, then ensuring that the number of shares is sufficient to meet the needs of both parties. The deal is consummated and automatically executed.

For most goods and services, however, the "dimensionality" of the buy-sell match problem is much larger—and more complex. A stock has three dimensions—symbol, order size, and price. Orders can be matched knowing only these three pieces of information. For most goods and services, however, more than three dimensions are required to identify the product for a potential buyer or seller. For example, if a person wants to buy a car, he or she needs to know the make, model, year, mileage, transmission-type, options, color and so forth. As each additional dimension is added, the complexity of the trading platform increases exponentially. Accordingly, conventional trading platforms are simply not capable of scaling as additional dimensions are needed because the number of tradable objects grows exponentially with the number of added dimensions, leading to impractically large memory requirements for these platforms and long response times for the market participants.

In view of the foregoing, it can be appreciated that a substantial need exists for a method and apparatus to perform multi-dimensional electronic matching and trading.

SUMMARY OF THE INVENTION

One embodiment of the invention comprises a method to trade objects over a network. A first order for an object having at least four dimensions associated with the object is received. A memory is searched for a second order with an object having at least four dimensions. The first order is matched with the second order in accordance with the search.

Another embodiment of the invention comprises a method of matching a buy order with a sell order in an online exchange, wherein orders are placed by a broker component and received by a trading pit component, and sell orders and buy orders include at least a price, order size and description of an object. The trading pit component first determines a set of all sell orders in the exchange that match said buy order, then selects the lowest-price sell order from the set and determines a maximal matching size for the buy order and the selected sell order. The trading pit constructs a fill of maximal size and reduces the size of the buy order and the selected sell order by said fill size. If the buy order is not completely filled, the next lowest-price sell order is selected and the process is repeated for that sell order.

Another embodiment of the present invention comprises a method of automatically executing a buy order and a matching sell order in an online exchange, wherein said online exchange has a trading pit and at least one broker, and wherein said buy and sell orders contain required features of an object and preferred features of an object. The trading pit determines a set of all sell orders that match the buy order's required features and sends the set to a broker. The broker selects an optimal sell order from the set according to the buy order preferred features, and automatically executes the order if there is a match.

Yet another embodiment of the present invention comprises a method of trading objects in an online exchange, wherein a trading pit receives a first order for an object having at least three dimensions associated with said object, and wherein each dimension has a value. The trading pit then searches a memory for other orders with objects having said at least three dimensions wherein the value for each dimension matches the first order and returns said other orders to a broker. The broker determines the optimal match among said other orders.

Another embodiment of the present invention comprises a method of matching a buy order and a sell order, wherein said orders have at least four dimension including a price and size in an online exchange, and wherein said orders are placed by a broker component and received by a trading pit component. The trading pit determines a set of sell orders that match the buy order in every dimension, and selects the lowest-price sell order from the set. Next the maximal matching size is determined for the buy order and the selected sell order and a fill is constructed of that size. The size of the buy order and the size of the sell order are reduced by the fill size. If the buy order is not completely filled, the next lowest-price sell order in the set is selected and the process is repeated.

Yet another embodiment of the present invention comprises a method of processing an order by a trading pit component in an online exchange, wherein said order is sent by a broker to the trading pit, wherein the trading pit receives a message from the broker, and said message contains a command to add an order, modify an existing order or delete an existing order. If said message contains a command to add a buy order, the trading pit determines any matches among sell orders and fills the order if any matches are found, and adds the buy order to a list of buy orders if no matches are found. If said message contains a command to add a sell order, the trading pit adds the sell order to a list of sell orders. If said message contains a command to modify an existing buy order or a command to modify an existing sell order, the trading pit modifies said order in the list of buy orders or the list of sell orders; and if said message contains a command to delete a buy order or a command to delete a sell order, the trading pit deletes said order from the list of buy orders or the list of sell orders.

With these and other advantages and features of the invention that will become hereinafter apparent, the nature of the invention may be more clearly understood by reference to the following detailed description of the invention, to the appended claims and to the several drawings attached herein.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

FIGS. 4A-4B are block diagrams illustrating data structures for use in accordance with one embodiment of the invention;

FIG. 5 is a block diagram illustrating components of a matcher engine according to one embodiment of the present invention;

DETAILED DESCRIPTION

Reference will now be made in detail to the embodiments of the invention, examples of which are illustrated in the accompanying drawings. Wherever possible, the same reference numbers will be used throughout the drawings to refer to the same or like components.

The embodiments of the invention include an online exchange infrastructure that can handle a multi-dimensional marketplace. This online exchange infrastructure is capable of performing matches in real-time and automatically executing matching orders.

It is worthy to note that any reference in the specification to "one embodiment" or "an embodiment" means that a particular feature, structure or characteristic described in connection with the embodiment is included in at least one embodiment of the invention. The appearances of the phrase "in one embodiment" in various places in the specification are not necessarily all referring to the same embodiment.

Figure 1A:
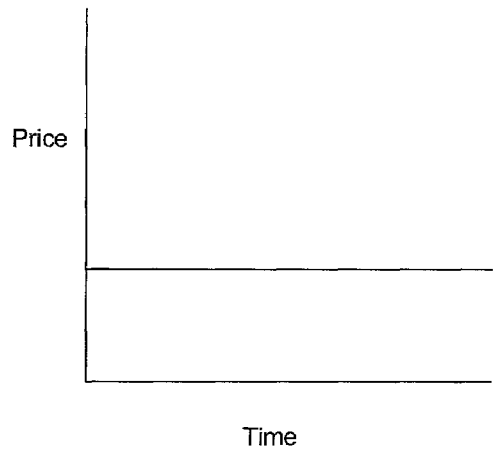
FIGS. 1A-1D illustrate the pricing that occurs for catalog, auction and exchange model markets.
Figure 1B:
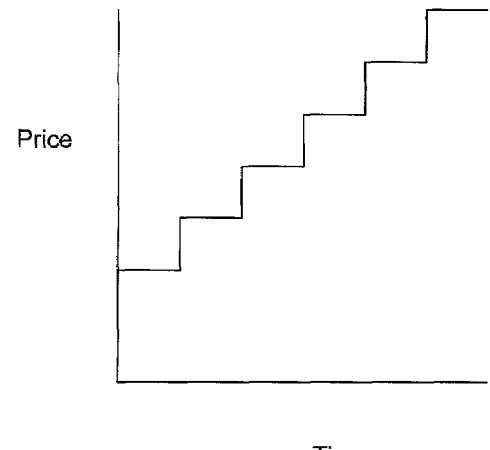
Figure 1C:
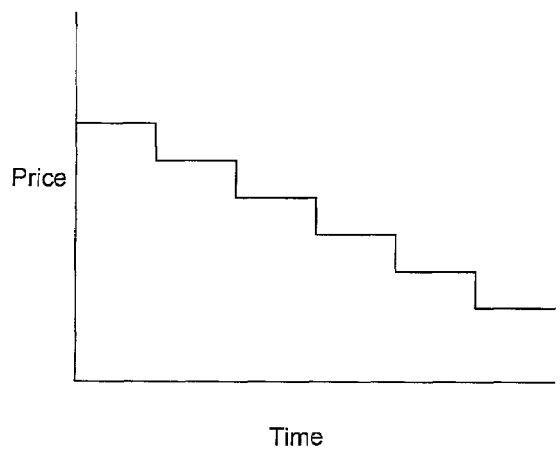
Figure 1D:
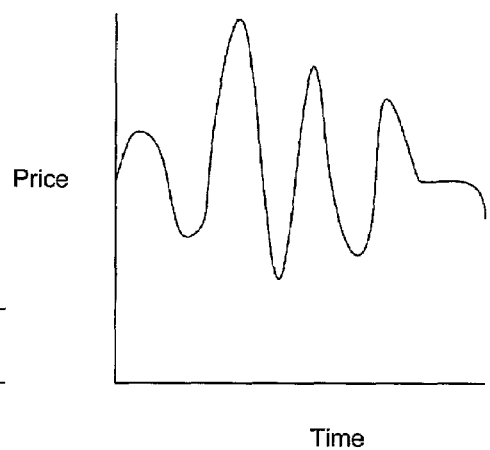

FIG. 1D illustrates dynamic price discovery exhibited by efficient marketplaces. As shown, the natural course of price movement in such a "free" market is not constrained by auction or catalog rules and constraints, illustrated by FIGS. 1A-1C. The type of dynamic price discovery and market efficiency shown in FIG. 1D is achieved in the online exchange market model.

The exchange model allows for dynamic price discovery, which results from continuous changes in supply and demand. In addition, parameters of the trade other than price can be similarly discovered in an online exchange model.

This model can accommodate not only bona fide buyers and sellers, but also speculators, hedgers and arbitrageurs, who are typical participants of stock and futures markets. Most economists believe that a liquid exchange with these participants is the most effective among known market models. Furthermore, economists believe that this model usually leads to finding near-optimal prices of all liquid commodities.

Many markets have the potential for benefiting from an online exchange market infrastructure. Markets characterized by supply and/or demand perishability and markets where product and service units are interchangeable (fungible or almost-fungible markets) are likely to realize the substantial economies of efficiency of an exchange marketplace.

One embodiment of the invention facilitates custom exchange markets where goods and services are traded in much the same way as stocks are traded on NASDAQ or the NYSE. This proven exchange model, expanded to include additional transaction parameters (like quality, model, color, delivery date and other attributes) takes advantage of online information and certain online market supply and demand dynamics.

Current exchanges developed for specific vertical markets are capable of trading billions of dollars in goods and services and delivering substantial revenue streams for the exchange market makers. Existing online exchanges, however, do not efficiently handle the multi-dimensional aspect of the market. For example, some online exchanges normalize all dimensions by limiting who may trade and allowing only products that meet certain predefined constraints. After normalizing the dimensions, the buyers and sellers compete on price alone.

In particular, traditional exchanges, such as the COMEX (Commodity Exchange) and CBOT (Chicago Board of Trade), allow for very efficient trading of standardized commodities, often as futures contracts. They enforce specific types of commodities, thus reducing the market to the three standard dimensions: commodity type, price, and order size. For example, a trader is allowed to buy or sell only one standard type of grain and only one standard type of crude oil. For this reason, people typically use the futures exchanges for hedging and speculating, and almost all actual purchases take place outside of these standardized liquid markets.

Current market makers have trouble directly increasing market liquidity and transaction volume because people cannot compare "similar" commodities across multiple dimensions, and therefore the number of transactions is reduced, resulting in a lack of liquidity.

The embodiments of the present invention comprise a method and system for creating an electronic exchange for any type of good or service of any dimensionality between multiple buyers and multiple sellers. The method and system of the present invention provides an exchange infrastructure for low-to-high velocity markets where the goods and services may be described by a set of several attributes. The inventive system allows for comprehensive order entry, it is transparent to market conditions and it supports real-time, optimal matching of buy and sell orders.

Online exchanges using the infrastructure provided by the present invention benefit from the significant transaction efficiencies between buyers and sellers, enabling commerce to leverage all of the infrastructure capable of replicating this level of efficiency, and customer satisfaction for the online, automated trading of goods and services.

The method and system of the present invention provides a multi-dimensional matcher engine for matching buy and sell orders. This matcher engine may be a complementary part of an existing or new market infrastructure and may be hosted with the market maker's server as an Application Service Provider (ASP). An exchange infrastructure with this type of functionality greatly enhances the transparency of the market, leading to substantially increased transaction volumes and liquidity.

The method and system of the present invention matches price, order size, and several other dimensions of transactions as dictated by the market, the buyers, and the sellers.

The method and system of the present invention provides for the automatic execution of matching buy and sell orders in a multi-dimensional market. In addition, when matching buy and sell orders are found, the transactions may be automatically executed, resulting in increased transaction volume.

The matcher engine of the present invention receives and processes both buy orders and sell orders. As an example, consider the case where a first order is a buy order while a second order is a sell order. One embodiment of the invention receives the buy order and looks for a matching sell order. In the same or another embodiment of the invention, the first order may be a sell order while the second order may be a buy order. In this embodiment of the invention, a sell order is received and the matcher engine attempts to match a buy order with the sell order. Although only a single buy order is received and a single sell order is searched (or vice-versa) in the above example, it can be appreciated that any number of orders could be searched in an attempt to match the first order.

One embodiment of the invention is directed to trading "objects." As used herein, the term "object" includes any goods, products or services that may be bought or sold over an electronic network. An example of goods might include vehicles, supplies, parts and other physical objects. An example of services might include insurance instruments, legal services, financial services, consulting services and so forth.

In addition, the system of the present invention supports "swapping," that is, exchanges of an object for another object, as opposed to buying or selling for cash. A user may place a swap order indicating that the object is available for exchange with one or more of several other objects. For example, a user may place an order to swap one highly valued collectable stamp with another. This feature is especially useful for markets that support trading of collectible items, such as art, stamps, baseball cards or rare jewelry.

One embodiment of the invention is directed to trading an object having at least four "dimensions." As used herein, the term dimension includes any parameter that can be quantified with respect to a particular good or service. For example, if the object is a vehicle, potential dimensions could include the vehicle manufacturer, model, year, mileage, color, service dates, and accessories.

An auto-execution feature may be added to the matching process. Once a first order and second order are matched, the party associated with the first order may be sent a message indicating that a match has been found. If both parties would like to complete the trade, it is automatically executed and the appropriate indicators may be stored in a user profile associated with each party to the trade. The back end processing of the trade (i.e., trade settlement) is then accomplished, including written confirmation of the trade, completing transfer of funds for payment or financing, delivery schedules and dates, insurance for the object, and so forth.

If the first order or second order is not filled, the order may be placed in a list of pending orders for future matching. A pending order may be modified or deleted by the party placing the order. If an order is modified, further matching may be performed immediately or at some later time.

In one embodiment of the invention, potential buyers and sellers may place "query" orders, whereby the order is not automatically executed, but rather information about potential matches is displayed to the particular user.

In one embodiment of the invention, user preferences are encoded and used by the matcher engine to determine an optimal match.

Figure 2:
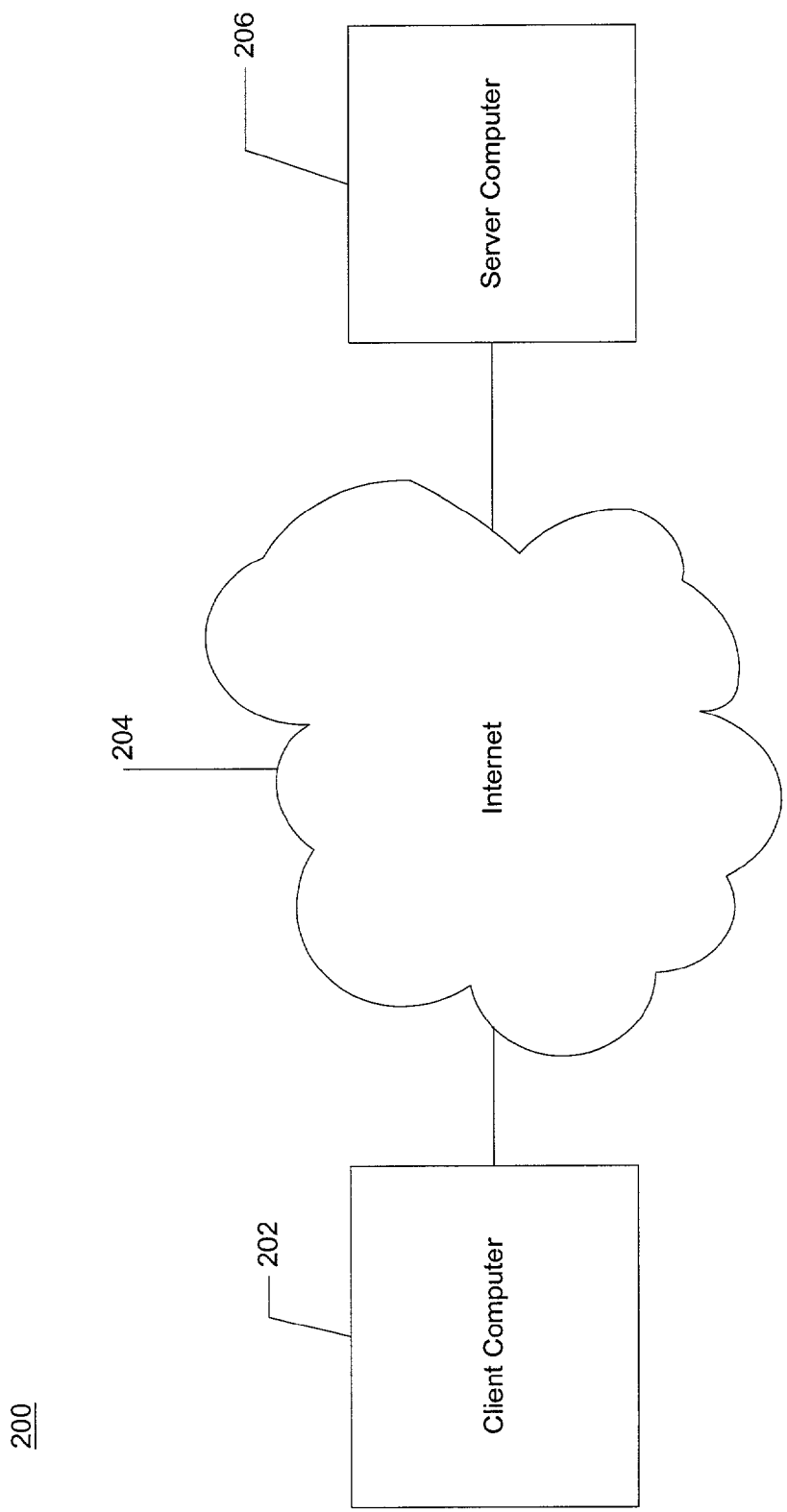
FIG. 2 is a block diagram of a computer system suitable for practicing one embodiment of the invention.

Referring now in detail to the drawings wherein like parts are designated by like reference numerals throughout, there is illustrated in FIG. 2 a system suitable for practicing one embodiment of the invention. FIG. 2 is a block diagram of a communication system 200 comprising a client computer system 202 and a server computer system 206 connected via a network 204, which in one embodiment of the invention is the Internet. In one embodiment of the invention, network 204 is a network capable of communicating using a variety of protocols, such as the Transport Control Protocol/Internet Protocol (TCP/IP) and File Transport Protocol (FTP) used by the Internet, and the Hypertext Transfer Protocol (HTTP) used by the World Wide Web (WWW). Server computer system 206 is an application server, which contains one or more data structures with buy and sell orders for an exchange.

In the embodiment shown in FIG. 2, client computer 202 may simply be a computer running a browser that is connected to the Internet. In this embodiment, the broker functionality may be performed by the server. In another embodiment, client computer 202 may be a computer with embedded broker functionality and dedicated interface. In this embodiment, additional analytics are run on the computer with the user interface. For example, some or all of the broker computation pertaining to the user interface may occur on this computer. The latter model provides for additional efficiency and scalability. As one skilled in the art will understand, there are many variations of performing computations on different computers within the system, and the scope of the present invention is intended to cover any of these variations.

Although FIG. 2 illustrates only one client computer, in an actual system, there may be many client computers. In addition, some end-user computers may be configured to run the broker functions, thus acting as broker modules, while others may be configured to use broker functionality at the server instead.

Although these embodiments have been described in terms of a client/server architecture, it will be obvious to one skilled in the art that other architectures, such as a peer-to-peer architecture, may be used, and are intended to come within the scope of the present invention.

Figure 3:
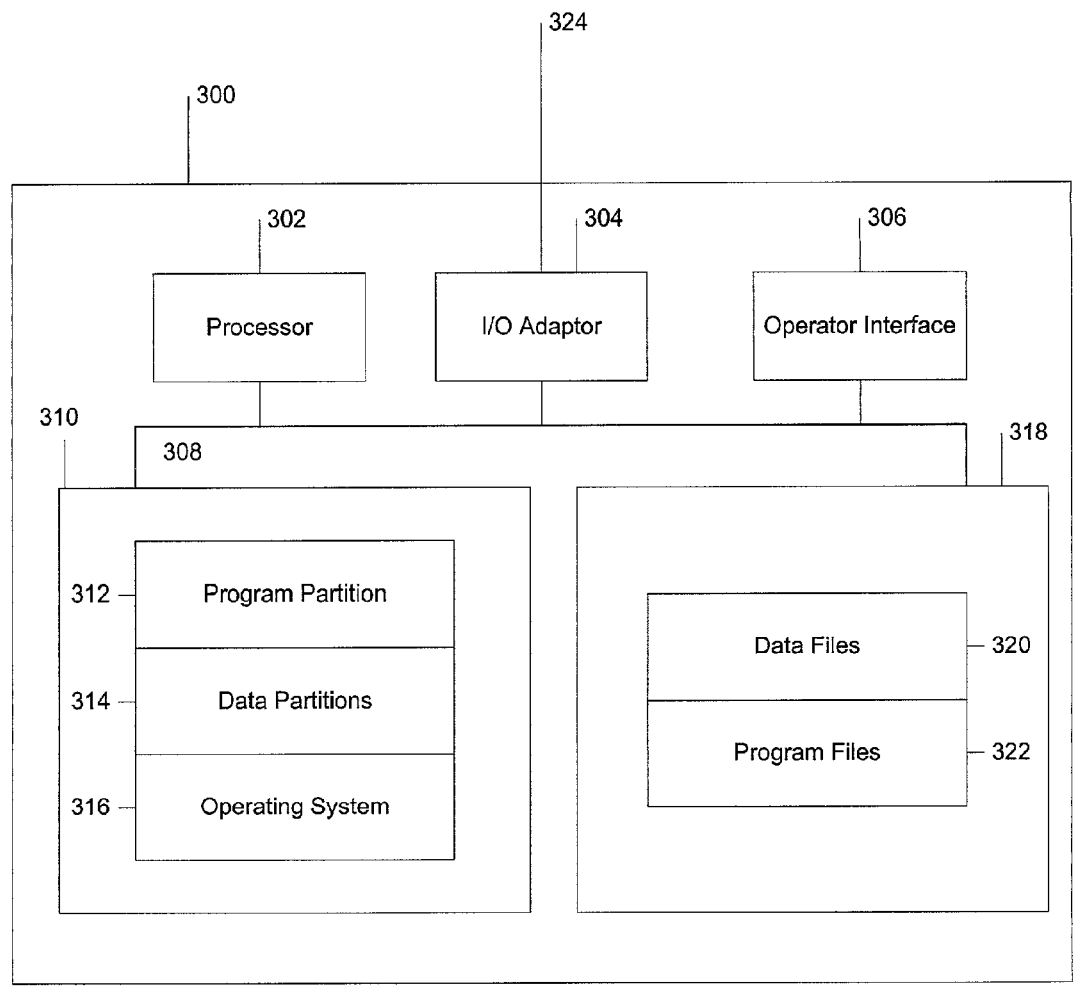
FIG. 3 is a block diagram of a computer system in accordance with one embodiment of the present invention.

FIG. 3 is a block diagram of a computer system 300, which is representative of computer systems 202 and 206, in accordance with one embodiment of the invention. Each of these blocks represents at least one such computer system. Although only one client computer system 202 and one server computer system 206 are shown in FIG. 2, it is well known in the art that multiple computer systems can be available and still fall within the scope of the invention. Further, it is also well known in the art that a distributed architecture in which more than one computer system performs each function is entirely equivalent.

In one embodiment of the invention, computer system 300 represents a portion of a processor-based computer system. Computer system 300 includes a processor 302, an input/output (I/O) adapter 304, an operator interface 306, a memory 310 and a disk storage 318. Memory 310 stores computer program instructions and data. Processor 302 executes the program instructions, and processes the data stored in memory 310. Disk storage 318 stores data to be transferred to and from memory 310. I/O adapter 304 communicates with other devices and transfers data in and out of the computer system over connection 324. Operator interface 306 interfaces with a system operator by accepting commands and providing status information. All these elements are interconnected by bus 308, which allows data to be intercommunicated between the elements. I/O adapter 304 represents one or more I/O adapters or network interfaces that can connect to local or wide area networks such as, for example, the network described in FIG. 2. Therefore, connection 324 represents a network or a direct connection to other equipment.

Processor 302 can be any type of processor capable of providing the speed and functionality required by the embodiments of the invention. For example, processor 302 could be a processor from a family of processors made by Intel Corporation, Motorola, AMD, Compaq Corporation or others.

For purposes of this application, memory 310 and disk 318 are computer-readable mediums and could include any medium capable of storing instructions adapted to be executed by a processor. Some examples of such media include, but are not limited to, read-only memory (ROM), random-access memory (RAM), programmable ROM, erasable programmable ROM, electronically erasable programmable ROM, dynamic RAM, magnetic disk (e.g., floppy disk and hard drive), optical disk (e.g., CD-ROM), optical fiber, electrical signals, lightwave signals, radio-frequency (RF) signals and any other device or signal that can store digital information. In one embodiment, the instructions are stored on the medium in a compressed and/or encrypted format. As used herein, the phrase "adapted to be executed by a processor" is meant to encompass instructions stored in a compressed and/or encrypted format, as well as instructions that have to be compiled, interpreted or installed by an installer before being executed by the processor. Further, system 300 may contain various combinations of computer-readable storage devices through other I/O controllers, which are accessible by processor 302 and which are capable of storing a combination of computer program instructions and data.

I/O adapter 304 includes a network interface that may be any suitable means for controlling communication signals between network devices using a desired set of communications protocols, services and operating procedures. As mentioned previously, in one embodiment of the invention, I/O adapter 304 utilizes the Transport Control Protocol (TCP) of layer 4 and the Internet Protocol (IP) of layer 3 (often referred to as "TCP/IP"). I/O adapter 304 also includes connectors for connecting I/O adapter 304 with a suitable communications medium (e.g., connection 324). Those skilled in the art will understand that I/O adapter 304 may receive communication signals over any suitable medium such as twisted-pair wire, co-axial cable, fiber optics, radio frequencies, and so forth.

Memory 310 is accessible by processor 302 over bus 308 and includes an operating system 316, a program partition 312 and a data partition 314. Program partition 312 stores and allows execution by processor 302 of program instructions that implement the functions of each respective system described herein. Data partition 314 is accessible by processor 302 and stores data used during the execution of program instructions.

In one embodiment of the invention, program partition 312 contains program instructions that are used to match buy/sell orders in a multi-dimensional exchange. These program instructions will be referred to herein collectively as a "matcher engine."

As shown in FIG. 5, the matcher engine 510 is preferably a distributed system with the central part of the matcher engine, or "trading pit" component, on a central computer 515, and "broker" component on one or more other computers 520, 521. However, as mentioned previously, many other types of distributed systems may be used, and are intended to come within the scope of the present invention.

The broker computers, also called "brokers," support a specific user or group of users, as shown by user interfaces 530, 531, 532. Each user interface may be used by one or more users. Brokers maintain information about the users they support, and typically have no access to other users or their orders. A broker typically communicates with the trading pit over a network. The role of the broker computers is similar to that of stockbrokers, serving as intermediaries between the users and the pit.

In one embodiment of the invention, the matcher engine is optimized for distributed use, with most computations performed on the brokers. In this manner, the load on the trading pit computer is minimized. The distributed architecture minimizes the flow of data between brokers and the trading pit and allows for future additions of new features by modifying the broker software, without affecting the trading pit. In this embodiment, the broker may use an HTTP and EJB (Enterprise Java Beans) session to authenticate and issue requests of the trading pit. Other methods are known to those skilled in the art and are intended to come within the scope of the present invention.

Although the matcher engine supports a distributed architecture, this is not essential for trading using the system of the present invention. The trading pit computer is able to perform all trading functions without broker computers. The role of the brokers is to ensure the scalability of the system and reduce the engine's response time.

The trading pit maintains lists of all pending orders, and identifies matches between buy and sell orders. The broker software then analyzes the orders that satisfy a user's hard constraints, and uses objective functions to identify preferable orders.

For example, suppose that the user would like to buy a green Toyota Echo, and that an automatic transmission is preferable, but not required; furthermore, the user has specified an amount of money that he or she is willing to pay for an automatic transmission. Then, the trading pit will identify all green Echos and send them to the broker, and the broker will then determine which of these matches are the best for the user.

Data structures used by the trading pit and broker in the present invention are shown in FIGS. 4A and 4B. As shown in FIG. 4A, the trading pit maintains a table of users and broker computers 405. This table may contain information about buyers, sellers, brokers, permissions and priorities of each user, user preference profiles, network information, etc. The trading pit also maintains lists of pending buy and sell orders 420. In one embodiment of the invention, the database of pending orders is kept in main memory to ensure a faster matching process.

In addition, the trading pit maintains description of the market space, as shown by 407. The market space is a specification of market dimensions, allowable values for each dimension, pre-defined sets of values, and allowable combinations of values. For example, the description of an automobile market may specify six dimensions: price, number of vehicles, model, color, year and mileage. It may further specify that the allowed models include Camry, Echo, Corolla and Tercel; the allowed colors include green, red, blue, silver and white; allowed year ranges from 1990 to 2001; and allowed mileage from 0 to 150,000.

A price function is a function defined on a subset of the market space. For each object and order size, it defines the corresponding price. Typically, it is used to define how much a buyer is willing to pay for a specific class of objects, or how much a seller is asking for a specific object. The price function may be implemented as a program in any programming language, such as C++ or Java. It takes an object and order size as input, and returns a price value.

A quality function encodes a user's preferences and serves for selecting among several possible trades. The quality function is optional in the system of the present invention. The quality function inputs an object, price and order size, and outputs a real-valued "quality" of the corresponding trade for the user.

Typically, the trading pit does not use these functions. If the user includes functions into an order, the broker sends an order without functions to the trading pit, waits for resulting matches, and then uses the functions to reject inappropriate or less preferred matches. By performing base matching functions on the trading pit computer, and preferential matching on the broker computers, the system and method of the present invention is able to quickly and efficiently find an optimal match for an order.

A buy order is a subset of the market space, along with the specification of the desired number of products, price function, and quality function. This buy order indicates that the user wants to buy any object or several objects in the specified subset of the market. For example, suppose that an order refers to a "green Toyota with mileage between 20000 and 40000." Then, the order describes the set of all possible green Toyotas with mileage in the specified range, which is a subset of the automobile market, which means that the user is willing to buy any of such Toyotas.

The user encodes a buy order as a sub-order, or a combination of several sub-orders, in the system of the present invention. Each buy sub-order contains several elements. These elements are discussed next.

First, a region of the market space is defined as a cross-product of one-dimensional regions. For example, suppose that the user wants to buy "Toyota or Honda, whose color is green or red, with mileage between 20000 and 40000." This order is a cross-product of three one-dimensional regions of the market space: the first region is the model, here "Toyota or Honda;" the second region is the color, here "green or red;" and the third region is the mileage, which is the "20000 to 40000" interval in this example.

A price limit field in the buy sub-order indicates the buyer's maximal acceptable price of the objects in the specified region, and is typically a required field. An optional public price field may be used to indicate an advertised purchase price, shown to potential sellers. The public price is no larger than the price limit, and may default to the price limit if no public price is defined.

An optional filter function may eliminate some subset of the defined region, thereby allowing the buyer to create a smaller, arbitrarily shaped region. It is a boolean function, which may input an object and return true or false, indicating whether the object belongs to the user-specified region. For example, a superstitious user may utilize a filter function to avoid cars whose mileage is divisible by 13.

An optional price function, as discussed above, sets the maximal acceptable price of each object in the defined region. If the buyer specifies both price limit and price function, the system may default to the least value as the maximal acceptable price.

An order size field specifies the number of objects that the user is willing to buy. In addition, the buyer may specify a minimum acceptable size of the transaction.

An optional quality function, as discussed above, shows the user's preferences among acceptable trades. If the user does not provide a quality function, the system may define it by default as the ratio calculated by dividing the object price by the maximal acceptable price. An optional quality threshold field is the value of the quality function below which the buyer does not want the object. For example, a buyer may use the quality threshold to reject an object whose price and order size combination is inadequate.

As shown in FIG. 4A, the trading pit maintains pending buy sub-orders in a separate list or table 425. In one embodiment of the present invention, buy and sell sub-orders have an expiration time. Therefore, the trading pit also maintains a priority queue of scheduled events 430 to track expiration times of pending sub-orders. By maintaining a priority queue of scheduled events, the trading pit is able to quickly identify expired orders.

A sell order consists of several sub-orders, where each sub-order describes a specific object, rather than a region of the market space. The order means that the user wants to sell exactly one of the several listed objects. For example, the user may specify that he or she is selling a "green Toyota Echo with 23410 miles or red Honda Civic with 45690 miles." Each sell sub-order typically has a price limit defining the minimal sale price. It may optionally have a public price, which is typically an advertised price shown to potential buyers. The public price is no smaller than the price limit. A sell sub-order also typically has an order size and an optional specification of minimal acceptable size.

The description of sell orders is more restrictive than that of buy orders because a seller must be very specific about available objects. For example, the seller of a used car has to specify an exact mileage rather than a range of miles, and an exact color rather than a disjunction of several colors. Preferably, the system of the present invention allows for short sales, but the description obeys the same restrictions as other sell orders.

Advantageously, sell sub-orders are maintained in an indexing tree 422 to facilitate an efficient search. Advantageously, each element of the sell sub-order description may be used as an index.

The indexing tree 422 arranges sell sub-orders by the object description and price, and supports a fast retrieval of all sell sub-orders that match a given buy sub-order. The indexing tree has several levels, where each level corresponds to a market dimension.

A single-level indexing structure arranges sell sub-orders by one of the dimensions. For example, for an automobile market, the orders may be indexed by model. This structure allows new sub-orders to be added, sub-orders with a specific value to be retrieved, sub-orders with a specific range of values to be retrieved, and sub-orders whose values belong to a certain pre-defined set to be retrieved.

A level of the indexing tree may be implemented by one of several indexing structures known to those skilled in the art, such as a red-black binary search tree, a hash table, or a sorted array.

When a buyer specifies the dimensions of a buy sub-order, he or she may use ranges, pre-defined sets, intersections and unions. The indexing tree supports the retrieval of matching sell sub-orders only for ranges and pre-defined sets. If the description includes an intersection, the trading pit finds the set of matching orders for each element of the intersection, and then computes the intersection of these sets. Similarly, if the description includes a union, the trading pit has to compute the union of several sets.

For example, suppose a user wants to buy a large Japanese car, where "large cars" and "Japanese cars" are two pre-defined sets of models. Then, the trading pit retrieves all sell sub-orders with large models and all sell sub-orders with Japanese models, and computes the intersection of these two sets.

Figure 12:
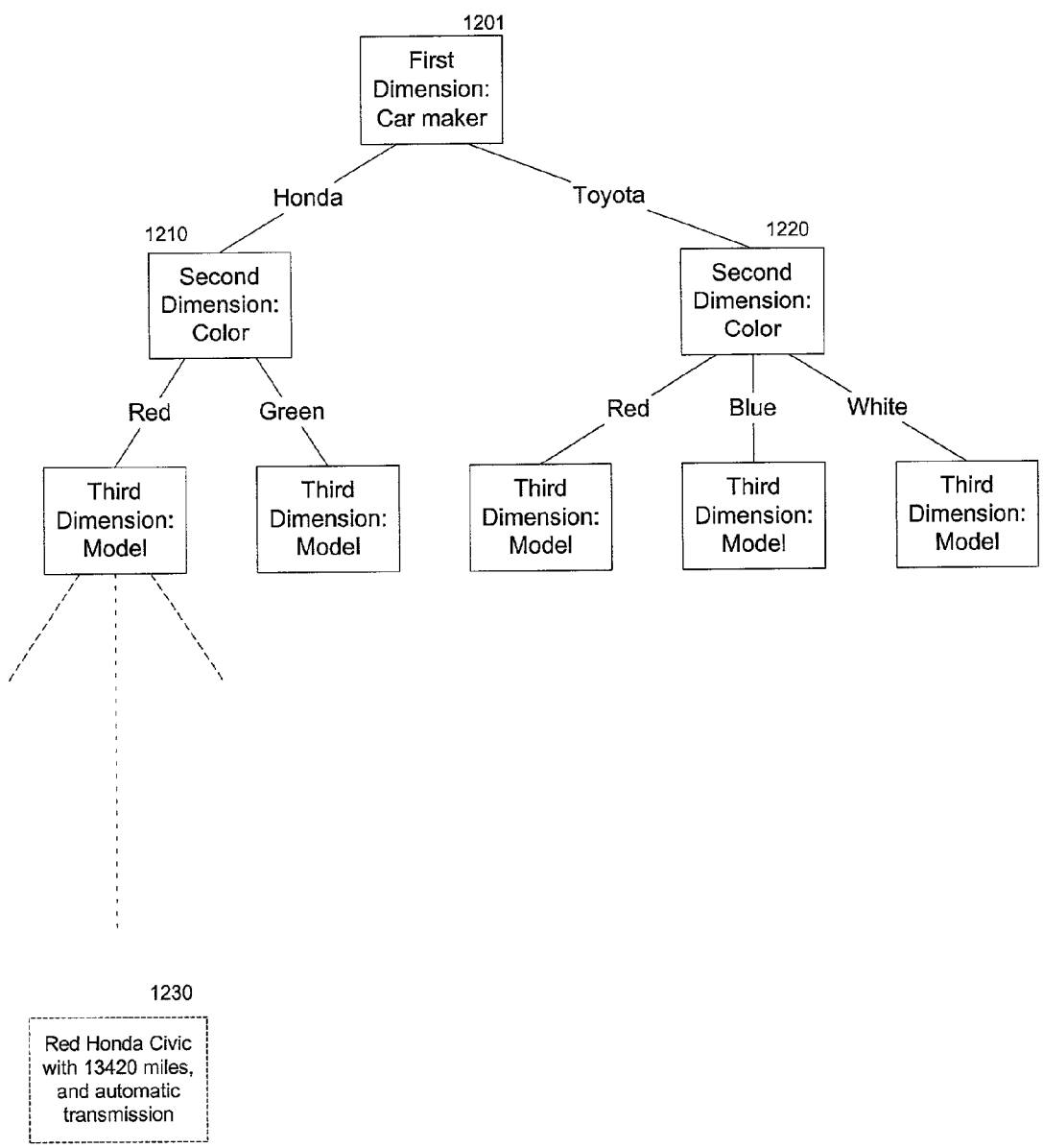
FIG. 12 is a diagram illustrating an indexing tree structure used in one embodiment of the present invention to store sell orders.

As shown in FIG. 12, the indexing tree is multi-level, where each non-leaf node is a single-level index. The root node 1201 arranges the sell sub-orders by their first dimension, thus breaking them into several groups, where each group includes all orders with a common value. For example, in an automobile market, if the first dimension is a car maker, then each group includes all cars by a specific maker currently offered for sale. This is shown by nodes 1210 and 1220 in FIG. 12. The root's children arrange the sell sub-orders by the second dimension, the grandchildren arrange them by the third dimension and so forth. The height of the tree is equal to the number of dimensions, and each leaf corresponds to a certain object. For example, leaf 1230 corresponds to a red Honda Civic with automatic transmission and 13420 miles.

If some objects are not currently on sale, the indexing tree does not include the respective nodes. For example, if no one is selling Mazdas, the root has no child for Mazdas. When a new object is offered for sale, the trading pit adds the appropriate new node to the tree. If some groups of sell sub-orders become empty, the trading pit removes the respective nodes.

A leaf may include multiple sell sub-orders with the same object, but with different prices and sizes. For example, it may include multiple orders to sell a "red Honda Civic, 13420 miles, automatic transmission," placed by different users. These sub-orders may be arranged in two binary-search trees; the first tree indexes the orders by price limit, and the second tree by public price.

The search procedure discussed below uses the indexing tree to find matches for a given buy sub-order. It explores the tree in the depth-first order by finding the root's children that match the first dimension of the buy sub-order, then recursively continuing to search the tree from one of these children. When the search procedure reaches a leaf, it picks the sell sub-orders with the matching price and size from this leaf and then backtracks.

After the trading pit finds the matching sell sub-orders, it picks the lowest-price matches and uses them to fill the buy order. If these matches do not require confirmation, the trading pit may immediately complete the trade.

As shown in FIG. 4B, each broker maintains a list of all users supported by that broker 430. In addition, each broker maintains a list of pending orders that were placed by the broker 440, and a list of recent messages sent to the trading pit by the broker 450. Each broker maintains a priority queue of scheduled events for that broker 460.

In one embodiment of the invention, the method and system of the present invention uses messages sent between the brokers and the trading pit. A broker can send a disjunctive order message to the trading pit that consists of several buy and/or sell sub-orders. A disjunctive order means that the user wants to execute exactly one of several sub-orders, and then delete the other sub-orders. Each sub-order includes a description of an object to be bought or sold, price limit and optional public price, total number of objects to buy/sell, minimum acceptable number of objects, and expiration time. For example, a disjunctive order may specify that the user wants to buy a green Tercel, or buy a red Echo, or sell a green Camry.

Both buy and sell orders may include objective functions, which encode the user's preferences. In a preferred distributed embodiment, the broker does not send these objective functions to the trading pit; instead, the broker uses the objective functions to choose best matches among all the matches found by the trading pit.

In addition to order messages, a broker may send a "sell query" message requesting matches for a potential sell order. This type of message is useful for a seller who would like to check out the market without immediately trading. The syntax of a sell query is preferably identical to the syntax of a sell order, discussed above. Likewise, a broker may send a "buy query" message.

Other messages from a broker to the trading pit may include order modifications and deletions, expiration time changes for specific orders, and a prioritized request to execute specific trades.

The trading pit also sends messages to brokers. One type of message is a notice that a buy or sell order, or a buy or sell query, has been received. The trading pit may send a message that contains a set of orders that match a broker's order or query. If an order has been matched and executed, the trading pit preferably sends a message containing a fill for an order.

The operation of systems 200, 300 and matcher engine 500 will be described with reference to FIGS. 6-11.

Figure 6:
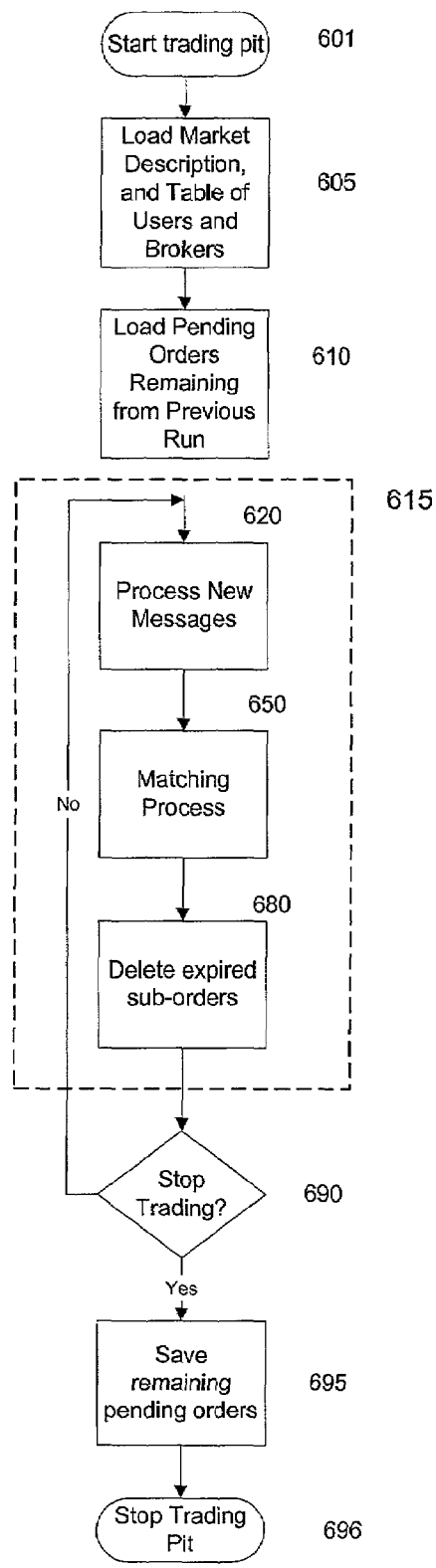
FIG. 6 is a block flow diagram of steps performed by a trading pit in accordance with one embodiment of the invention.

FIG. 6 is a block flow diagram of steps performed by a trading pit in one embodiment of the invention. As shown in FIG. 6, the trading pit is initially prepared at steps 601, 605 and 610. As discussed earlier, a trading pit may support several brokers, and each broker may support one or more users.

Any orders that were pending at the stop of the previous session are loaded at step 610. The system and method of the present invention will attempt to match these orders during this session. The system will check the expiration times of pending orders, and remove any expired orders before performing the matching process.

The system and method of the present invention is a continuously operating exchange, where orders are continuously received, processed, matched and executed. The basic message-processing cycle is shown by box 615. As shown, steps 620, 650 and 680 are repeated continuously until it is time to stop trading, as shown by step 690. Step 690 may be ignited by receiving a termination signal, or by reaching a pre-set termination time. For example, a human operator may stop the matcher for periodic maintenance. If the market does not operate 24 hours a day, the operator may stop it every evening. If the market runs continuously, it may be stopped only for upgrading software or hardware. Steps 620, 650 and 680 may run for an indefinite time.

Steps 620, 650 and 680 illustrate a high-level overview of the message-processing cycle. At step 620, the trading pit receives and processes new messages from brokers. These messages typically contain new buy and sell orders, modifications to existing orders, and instructions to delete existing orders. At step 650, the trading pit searches for matching sell sub-orders for each pending buy sub-order. At step 680, sub-orders that have expired without being traded are deleted.

After trading has stopped, any remaining active sub-orders are saved at step 695 so that they may be used after the trading pit is re-started. The trading pit computer is shut down at step 696.

Figure 7:
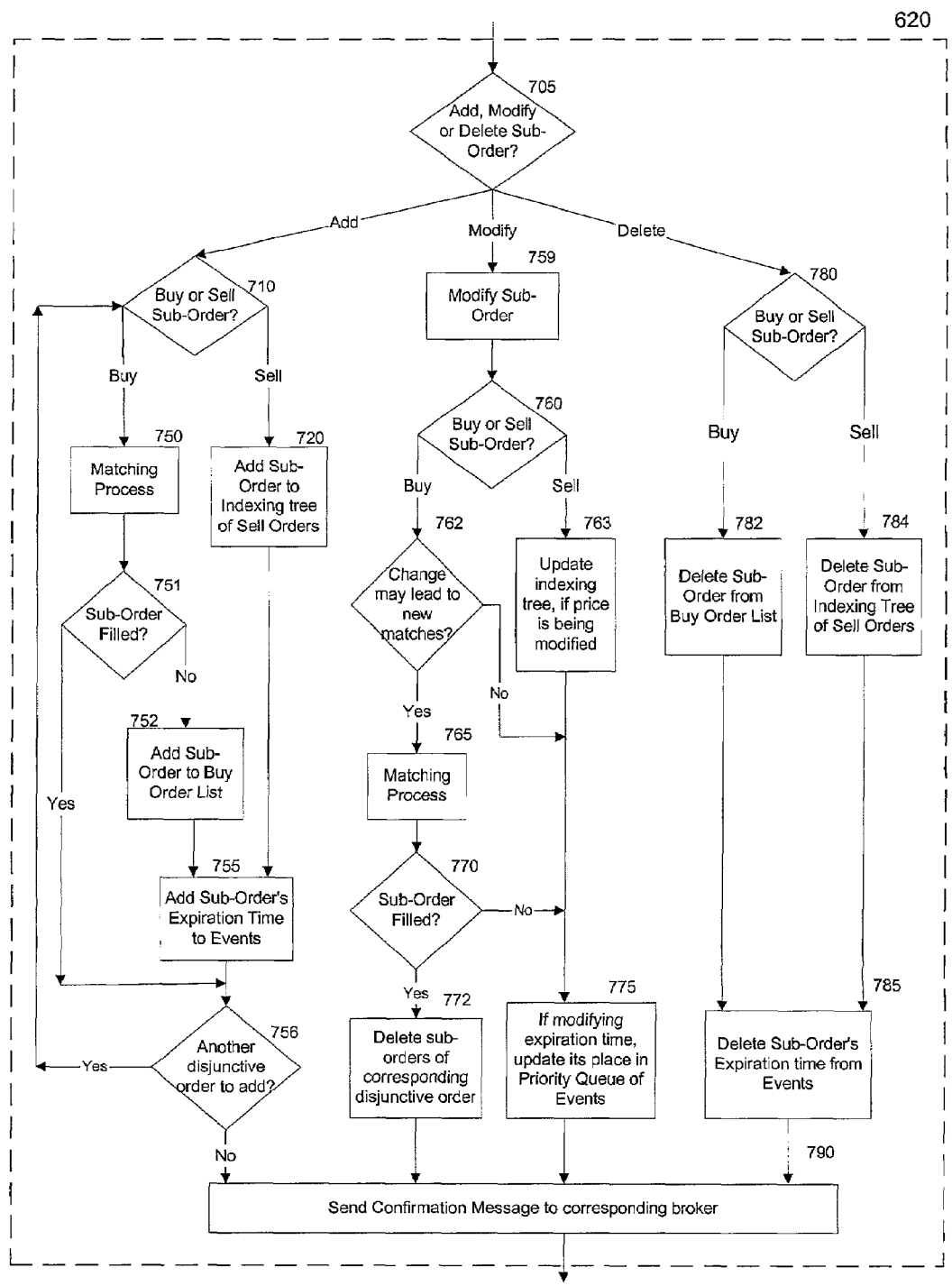
FIG. 7 is a block flow diagram of steps performed by the trading pit to process new messages from a broker in accordance with one embodiment of the present invention.
Figure 8:
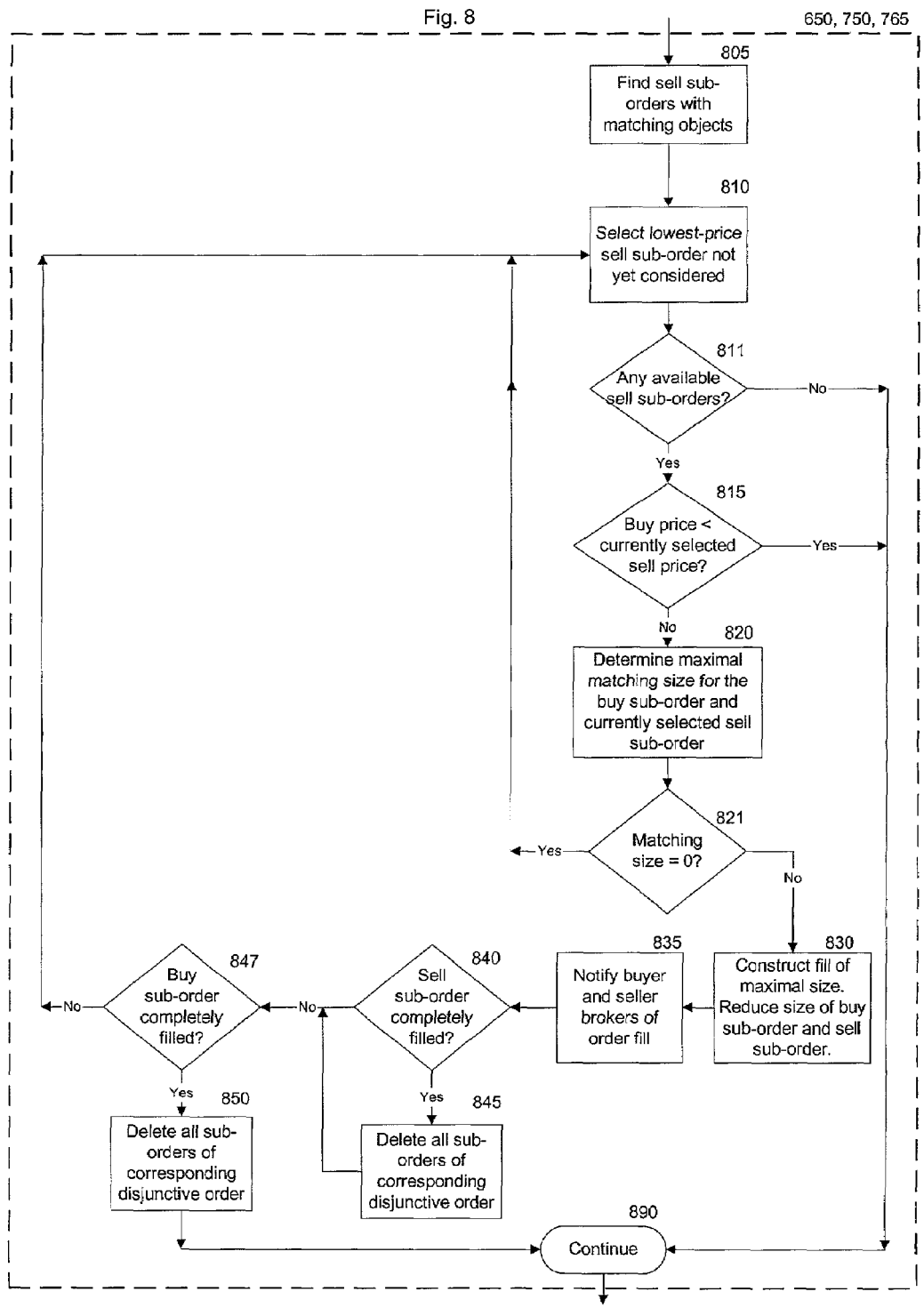
FIG. 8 is a block flow diagram of steps performed by the trading pit to match buy and sell sub-orders.
Figure 9:
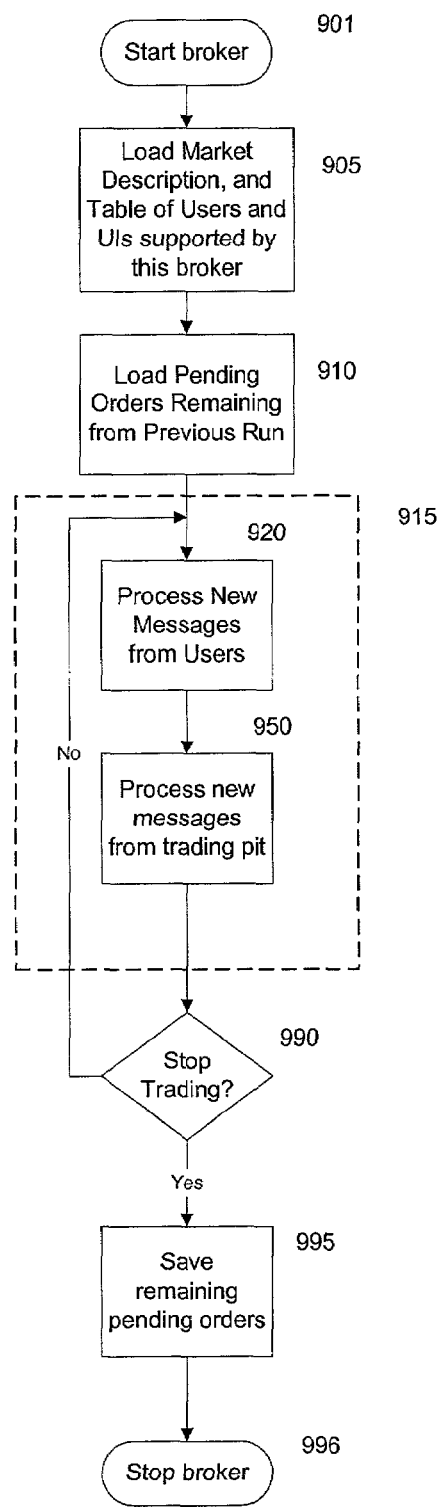
FIG. 9 is a block flow diagram of steps performed by a broker in accordance with one embodiment of the present invention.

The message-processing functions are explained in more detail in FIGS. 7-9. Step 620 is expanded and illustrated in more detail in FIG. 7. Brokers send messages to the trading pit to add, modify or delete sub-orders. As shown by step 705, the trading pit processes the message differently according to whether it is an Add Disjunctive Order, Modify Sub-Order, or Delete Sub-Order message from the broker.

If the message is an Add Disjunctive Order message, the trading pit adds the order's sub-orders one by one. For each sub-order, the trading pit first determines whether the sub-order is a buy or sell sub-order at step 710. If it is a buy sub-order, the trading pit next determines whether there are any matching sell sub-orders at step 750. This matching process is discussed in more detail with FIG. 8. If this new sub-order is filled by the matching process 750 as determined at step 751, a confirmation message is sent to the broker, and the process continues. If this buy sub-order is not filled by the matching process as determined at step 751, it needs to be added to the list of pending buy sub-orders, as shown by step 752, and its expiration time added to the priority queue of scheduled events at step 755. If the sub-order is a sell sub-order, it is added to the indexing tree of sell orders at step 720, and its expiration time is added to the priority queue of scheduled events at step 755.

If the message is a Modify Sub-Order message, the trading pit first determines whether the sub-order is a buy or sell sub-order at step 760. If it is a buy sub-order, the trading pit next determines whether the change may lead to new matches at step 762, in which case it searches for matching sell sub-orders at step 765. A change that requires a new matching search may be a change in order size, price limit or public price. If the modified sub-order is filled, then all sub-orders of the corresponding disjunctive order are deleted, as shown by steps 770 and 772.

If the modified buy sub-order is not filled by the matching process of step 765 as determined at step 770, its place in the priority queue of events is updated if its expiration time has been modified.

If the sub-order is a sell sub-order at step 760, the sub-order's place in the indexing tree of sell orders is updated if the price is being modified, at step 763. In addition, if its expiration time was modified, its place in the priority queue of events is updated at step 775.

If the message is a Delete Sub-Order message, the trading pit first determines whether the sub-order is a buy or sell sub-order at step 780. If it is a buy sub-order, it is deleted from the buy order list at step 782. If it is a sell sub-order, it is deleted from the indexing tree of sell orders at step 784. In either event, the sub-order's expiration time is deleted from the priority queue of events at step 785.

In one embodiment of the invention, a confirmation message is sent to the corresponding broker at step 790 once the message from the broker to add, modify or delete an order has been completely processed. The broker preferably sends a confirmation to the appropriate user interface.

As shown in FIG. 7, when adding or modifying a buy sub-order, the trading pit immediately searches for new matches, as shown by steps 750 and 765. If the search leads to filling the sub-order, all elements of the corresponding disjunctive order are deleted.

After new messages are processed at step 620, as described above, the trading pit searches for matching sell sub-orders for each pending buy sub-order at step 650. This is the same matching process that may have been run at steps 750 and 765 when processing new messages.

The search for sell sub-orders that match a given buy sub-order is shown in more detail in FIG. 8. This is the process used by steps 650, 750 and 765. First, at step 805, the indexing tree of sell sub-orders is used to find matching objects. The sell sub-order with the lowest price among sell sub-orders with matching objects is selected at step 810. If there are no sell sub-orders with matching objects, the process continues from step 811 to 890. Otherwise, the system next determines whether the price in the buy sub-order is smaller than the price of the selected sell sub-order at step 815. If it is, then the buy sub-order cannot be matched, and the process continues to step 890.

If the buy price is not smaller than the currently selected sell price, then the process continues to step 820, where the maximal matching size for the buy sub-order and the currently selected sell sub-order is determined. If the matching size is zero, then the next lowest-price sell sub-order is selected by following steps 810, 811 and 815 again. If the matching size is nonzero, then the order can be filled. As shown by step 830, a fill of the maximal matching size determined in step 820 is constructed, and the size of the buy and sell sub-orders are reduced by this fill size. The buyer and seller are notified about the fill at step 835.

If the trade of step 830 has completely filled the sell sub-order as determined at step 840, then all other sub-orders of the corresponding disjunctive order are deleted at step 845. If the trade of step 830 has not completely filled the buy sub-order as determined at step 847, steps 810-847 are repeated for the remaining portion of the buy sub-order. If the buy sub-order has been completely filled, all sub-orders of the corresponding disjunctive order are deleted at step 850, and the process continues at step 890.

FIG. 9 is a block flow diagram of steps performed by a broker in a distributed matcher engine in one embodiment of the invention. As shown in FIG. 9, the broker is initially prepared at steps 901, 905 and 910.

Any orders that were pending at the stop of the previous session are loaded at step 910. The system and method of the present invention will attempt to match these orders during this session. Any orders that have reached their expiration times are removed before matching.

The system and method of the present invention is a continuously operating exchange, where orders are continuously received, processed, matched and executed. Box 915 shows the basic message-processing cycle for the broker. As shown, steps 920 and 950 are repeated continuously until it is time to stop trading, as shown by step 990. Step 990 may be initiated by receiving a termination signal. It may run for an indefinite time.

Steps 920 and 950 illustrate a high-level overview of the message-processing cycle on the broker. At step 920, the broker processes new messages from user interfaces. These messages typically contain new buy and sell orders, modifications to existing orders, instructions to delete existing orders, and confirmations of specific trades. At step 950, the broker processes new messages from the trading pit. The broker continues the message-processing cycle until getting an end-trading signal from the trading pit or a termination signal from a human operator. The broker maintains a list of pending orders placed through it that mirrors the trading pit's record of the orders placed through this broker.

Figure 10:
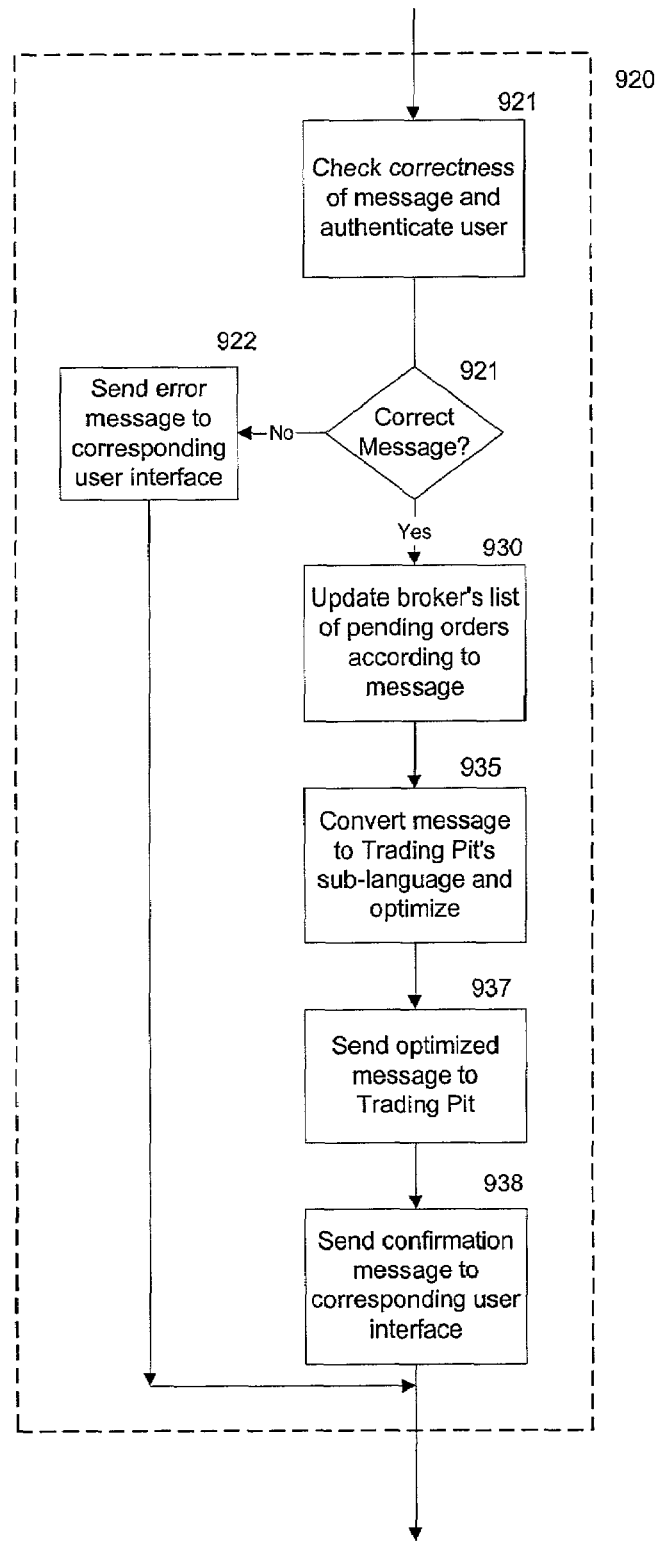
FIG. 10 is a block flow diagram of steps performed by a broker to process a new message from a user in accordance with one embodiment of the present invention.

Step 920 is shown in more detail in FIG. 10. As shown, the correctness of the message is checked and the user is authenticated at step 921. If there is a problem, an error message is sent to the corresponding user interface at step 922. Otherwise, the broker's list of pending orders is updated at step 930, according to the message. That is, an order is added, modified or deleted. At step 935, the message is converted to the trading pit's sub-language and optimized for fast processing. At step 937, the message is sent to the trading pit. This is the message that the trading pit receives at step 620, shown in FIGS. 6 and 7. Finally, a confirmation message is sent to the corresponding user interface at step 940.

Figure 11:
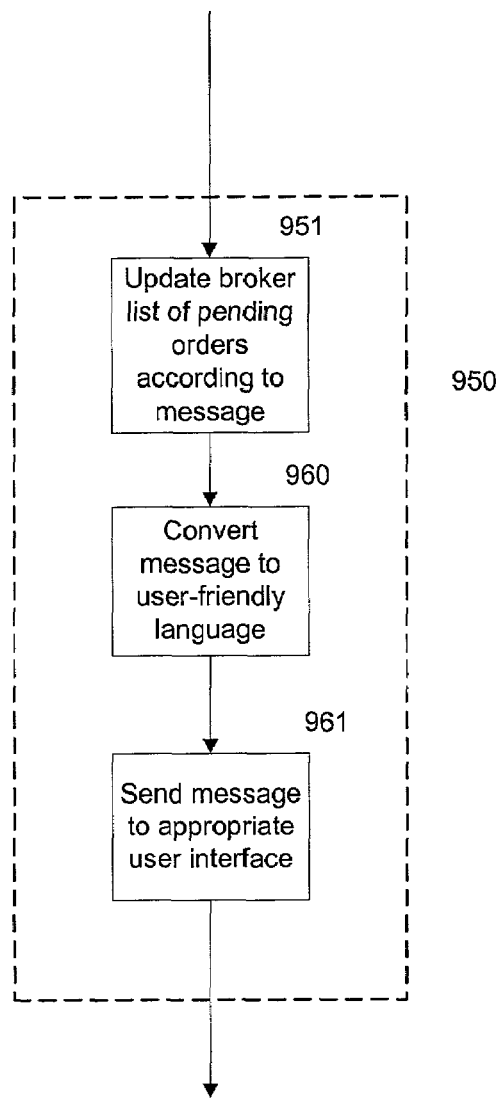
FIG. 11 is a block flow diagram of steps performed by a broker to process a new message from the trading pit in accordance with one embodiment of the present invention.

Step 950 is shown in more detail in FIG. 11. As shown, a new message from the trading pit is processed by first updating the broker's list of pending orders at step 951. That is, an order is modified or deleted according to the message. The message received from the trading pit corresponds to the message sent by the trading pit at step 790 shown in FIG. 7. Next, the message is converted to a user-friendly language at step 960 and sent to the appropriate user interface at step 961.

After trading has stopped, any remaining sub-orders are saved at step 990 so that they may be used after re-starting the broker. The broker computer is shut down at step 995.

The present invention has been described using an automobile market as an example. However, the present invention is applicable to any number of markets. For example, the method and system can be applied to network services, insurance, bonds and energy markets.

In the case of an online exchange for network services using the method and system of the present invention, telephone companies may buy and sell different services related to telephone and Internet. These services may include long-distance minutes, wherein a buyer purchases the right to use long-distance minutes through a seller's network, during a specific period, up to a certain number of minutes. The standard price specification is per-minute price. For example, AT&T may purchase 100,000 minutes from MCI, for January 2001 through March 2001, at 10 cents a minute.

Another service that may be sold in this exchange is network bandwidth, measured in Megabits per second. For example, a buyer may purchase 1000 Megabits per second for January 2001 through March 2001

Yet another service that may be sold in a network services online exchange is routed Internet Protocol (IP), where a buyer purchases the right to transmit a certain number of standard-size data packets over the network, during a specified period. For example, the buyer may purchase the right to transmit 1,000,000 packets in January 2001 through March 2001.

The "order size" measure is called "capacity" in this market, and it may be different for different services. For example, the size of the "minutes" purchased is measured in minutes, the size of the "bandwidth" purchased is in Megabits per second, and the size of the "routed IP" purchased is the number of packets.

The dimensions of this market may include service type (e.g., minutes, bandwidth or routed IP), origination city, destination city, beginning and ending date of service, buyer credit rating and seller credit rating.

In addition, this market may include dimensions that describe service quality, such as answer seizure rate for long-distance calls, service guarantee, service level agreement, call detail record (accuracy of billing), post-dial delay, bit error rate, latency, errored seconds (average frequency of distorted seconds), severely errored seconds and degradation.

In a network services market as defined above, a buyer may place an order for 10,000 long distance minutes from Pittsburgh to New York, for the period from Jan. 1, 2001 to Mar. 31, 2001, with a buyer credit rating of A, and a preferable seller credit rating of B or better. The order may also specify that the answer seizure rate is at least 95%, and the post-dial delay is no more than 1.15 seconds. In one embodiment of the present invention, the trading pit finds all sell orders matching the requirements, and then the broker would use the quality dimensions to determine which of the matched sell orders are preferable.

An example of another market that may use the method and system of the present invention is the insurance market, where re-insurance contracts are traded between insurance companies.

The "order size" in this market is often one, as usually one contract is traded at a time. The market may have the following 11 dimensions: (1) type of re-insurance service (e.g. facultative, treaty, retro or special acceptance); (2) type of insurance instrument (e.g. primary, excess of loss, aggregate, stop loss and insurance loss waiver); (3) type of coverage (e.g. casualty/general liability, casualty/auto liability, property/single location, property/catastrophe, other/health care and other/professional liability); (4) location of insurance customer; (5) industry of insurance customer; (6) buyer credit rating; (7) seller credit rating; (8) total insured value; (9) attachment point; (10) retention (deductible); and (11) loss ratio.

Another example of market that may use the method and system of the present invention is the bond market. In this market, bonds and other fixed-income securities, such as commercial paper, are traded. The price in the exchange is expressed as interest rate, as opposed to dollar price. For example, a trader may indicate that he is selling a certain bond at 6.00% interest. The order size is in dollars; for example, a trader may sell a bond in the total amount of $10,000.

This market may include the following 11 dimensions: (1) issuance date; (2) maturity date; (3) payment frequency; (4) notice whether a bond is callable; (5) federal tax exemption; (6) state tax exemption; (7) seller credit rating; (8) seller type (e.g. corporation, municipality or federal government); (9) home state of a buyer; (10) home state of a seller; and (11) brokerage firm.

As these examples demonstrate, the system and method of the present invention can handle markets that have a large number of dimensions.

There are several additional features of the system and method of the present invention. As discussed above, users may enter buy queries and sell queries indicating that they do not want to commit to an automatic trade. A user inputs a query to see what would happen if he or she placed a specific trade, and the system displays the available trades without executing them. Preferably, when searching for matching queries, the system uses public prices rather than price limits.

A confirmation mechanism allows a user to browse through potential trades and manually select a desirable trade. If the user indicates that an order needs a confirmation, the system identifies potential matches and displays them to the user, without executing any trade. If the user confirms some matches, the system attempts to execute the appropriate trades. However, it does not lock the matching trades and therefore cannot guarantee that they remain available until confirmation.

Activation and expiration times of an order determine when the order becomes "tradable" and when it must be deleted. A user has an option to specify these times for each order and query.

Bin-packing is a mechanism for finding multiple sell sub-orders that match a single buy sub-order, or multiple buy sub-orders that match a single sell sub-order. The inventive system can "pack" two or more orders together to fulfill another order.

A club-trading mechanism allows a user to specify preferred trading parties. For example, a US bank may indicate a preference for dealing with other domestic banks, and will only consider foreign parties if no domestic trades are available. The system first attempts to find matching orders placed by preferred parties, and then searches for other matches. If the price offered by a preferred party is as good as the best available price, the trade is completed with the preferred party. Club trading also allows a user to specify undesirable trading parties. In this case, any matches with an undesirable party are ignored.

In addition to the increased transaction volume due to automatic matching, the method and system of the present invention provides a set of advanced tools for finding the optimal match for each order. Not only does the method and system of the present invention provide a powerful matcher engine for finding exact matches, but it also finds appropriate near-matches. This near-matching capability gives buyers and sellers alike the ability to assess the "marketability" of their orders given current market conditions. Market intelligence about the nearness of their bids or offers is invaluable information and can often lead to buyer-seller attraction and ultimately the consummation of additional transactions that would not have otherwise occurred.

The method and system of the present invention may also increase transaction volume through aggregation. Vertical markets often become fragmented, primarily due to competition. An example of the effects of fragmentation are those found in the equity markets with the proliferation of electronic communications networks (ECNs). Supply-demand equilibriums for localized markets moving out of synchronization with each other leads to inefficiencies and impedes transaction volume while buyers and sellers withdraw and attempt to assess the current consolidated market equilibrium. For low-dimensional markets like equities, the determination of market equilibrium is conceptually simple. With higher-dimensional markets, automated tools are necessary to gather the relevant multi-dimensional information from each and every localized market.

Ultimately, a market maker would like to offer a service whereby orders that cannot be matched within the local market may be matched within another market segment. Getting paid for bringing either the buyer or the seller of a consummated transaction is better than forfeiting revenue when no "local" buy-sell match exists. Electronic commerce over the Internet lends itself to this sort of inter-market matching capabilities, as the pertinent information is generally just a few network hops away. Inter-market order information aggregation is an important component of an online market maker's infrastructure that can lead to increased transaction volume and more efficient decision criteria/trade discovery.

The method and system of the present invention provides tools for aggregating data from remote markets or exchanges, and delivers broad market intelligence to both buyers and sellers.

The method and system of the present invention can be applied to almost any vertical market, creating multi-dimensional online exchanges and optimized meta-exchanges that aggregate buy/sell data from multiple, disparate markets.

The method and system of the present invention can also be applied to multi-dimensional auctions as well as exchanges.

There is a need for a multi-dimensional exchange infrastructure. There is a need for a matcher engine for matching buy/sell orders, as well as finding optimal near-matches. There is a need for market-aggregation tools to prevent the fragmentation of vertical markets. The system and method of the present invention provides such a multi-dimensional electronic trading platform for multiple buyers and multiple sellers.

Although various embodiments are specifically illustrated and described herein, it will be appreciated that modifications and variations of the present invention are covered by the above teachings and within the purview of the appended claims without departing from the spirit and intended scope of the invention. For example, although the embodiments of the invention implement the functionality of the processes described herein in software, it can be appreciated that the functionality of these processes may be implemented in hardware, software, or a combination of hardware and software using well-known techniques. As another example, the embodiments were described herein using a communication network. A communication network, however, can utilize an infinite number of network devices configured in an infinite number of ways. The communication network described herein is merely used by way of example, and is not meant to limit the scope of the invention.

The invention claimed is:

1. A computer-implemented method for order matching implemented over a network, comprising:
   providing a filter specified by a user, wherein the filter defines an arbitrarily-shaped region within at least four dimensions;
   receiving, over said network, a buy order from the user for an object having the at least four dimensions associated with said object, wherein the buy order includes the filter specified by the user that defines the arbitrarily-shaped region within the at least four dimensions;
   receiving, over said network, a message to modify said buy order while said buy order is pending, wherein said message is received from a party associated with the buy order;
   modifying said buy order in accordance with said message;
   encoding user-preferences associated with at least one of the buy order or one of a plurality of sell orders;
   searching with at least one computer, and in accordance with the filter specified by the user, an indexing tree that includes the plurality of sell orders for objects having said at least four dimensions and, in accordance with said searching, identifying only one or more sell orders that are within said arbitrarily-shaped region;
   applying, with said at least one computer, characteristics of the one or more sell orders that are within said arbitrarily-shaped region and the encoded user preferences, to a quality function, and outputting, from the quality function, one or more quality values for the one or more sell orders that are within said arbitrarily-shaped region to the user; and
   matching, with said at least one computer, said buy order to one or more of the sell orders that are within said arbitrarily-shaped region in accordance with said one or more quality values.

2. The method of claim 1, wherein said object is at least one of a group comprising goods and services.

3. The method of claim 1, wherein said object is a vehicle.

4. The method of claim 3, wherein said at least four dimensions for said vehicle comprises at least four dimensions from a group of dimensions comprising manufacturer, model, year, mileage, color, and accessories.

5. The method of claim 1, further comprising:
   receiving a message from said party to execute said buy order; and
   automatically executing said buy order in accordance with said message.

6. A computer-implemented method for order matching implemented over a network, comprising:

providing a filter specified by a user, wherein the filter defines an arbitrarily-shaped region within at least four dimensions;

receiving, over said network, a sell order from the user for an object having the at least four dimensions associated with said object, wherein the sell order includes the filter specified by the user that defines the arbitrarily-shaped region within the at least four dimensions;

receiving, over said network, a message to modify said sell order while said sell order is pending, wherein said message is received from a party associated with the sell order;

modifying said sell order in accordance with said message;

encoding user-preferences associated with at least one of the sell order or one of a plurality of buy orders;

searching with at least one computer, and in accordance with the filter specified by the user, an indexing tree that includes the plurality of buy orders for objects having said at least four dimensions and, in accordance with said searching, identifying only one or more buy orders that are within said arbitrarily-shaped region;

applying, with said at least one computer, characteristics of the one or more buy orders that are within said arbitrarily-shaped region and the encoded user preferences, to a quality function, and outputting, from said quality function, one or more quality values for the one or more buy orders that are within said arbitrarily-shaped region to the user; and matching, with said at least one computer, said sell order to one or more of the buy orders that are within said arbitrarily-shaped region in accordance with said one or more quality values.

* * * * *